United States Patent [19]

Horn et al.

[11] Patent Number: 4,484,826
[45] Date of Patent: Nov. 27, 1984

[54] AUTOMATIC INTERTEXT COLUMN SPACING

[75] Inventors: Gary R. Horn; Kenneth O. Shipp, Jr., both of Austin, Tex.

[73] Assignee: International Business Machines Corporation, Armonk, N.Y.

[21] Appl. No.: 305,255

[22] Filed: Sep. 24, 1981

[51] Int. Cl.$^3$ .............................................. B41J 25/18
[52] U.S. Cl. ........................................ 400/279; 400/3;
400/76; 400/83; 364/900; 340/720
[58] Field of Search ...................... 400/2, 3, 63, 64, 67,
400/68, 76, 83, 279, 705.4, 705.5; 364/200, 900;
340/720, 721, 723, 724

[56] References Cited

U.S. PATENT DOCUMENTS

| 3,952,852 | 4/1976 | Greek et al. | 400/279 |
| 4,207,011 | 6/1980 | Pascoe | 400/279 |
| 4,223,393 | 9/1980 | Abe et al. | 364/900 |

OTHER PUBLICATIONS

IBM Technical Disclosure Bulletin, "Column Equalization," Howell et al., vol. 25, No. 1, Jun. 1982, pp. 388–390.
IBM Program Product "Documentation Composition Facility/User's Guide", Second ed., Apr. 1980, No. SH20-9161-1, Ch. 5, pp. 67–69.

*Primary Examiner*—Ernest T. Wright, Jr.
*Attorney, Agent, or Firm*—R. Bruce Brodie

[57] ABSTRACT

In a column layout operation in an interactive word processing system, the unoccupied character escapement along a column example line is automatically evenly distributed by the insertion of an appropriate number of space characters responsive to the stroking of a predetermined function key.

3 Claims, 6 Drawing Figures

```
 _____
|  table left margin           table right margin
|  v                                     v
|  *                    *       *        *
|  *<-column-->*<-gutter->*<-column->*<-gutter->*<-column>*
|  * width     *  width    *  width    *  width  *
|  *   1       *    2      *    2      *    3    *
|  *           *           *           *         *
|  <<..........|...........|...........|.........>>
|  xxxxxxxxxx              xxxxx.xxxx            xxxx.xx
|  xxxxxxxxx               xxxx.xxx              xxxx.xx
|  xxxxxxx                 xxxxx.xx              xxxx.xx
|  xxxxxxxx                  xx.xxx              xxxx.xx
|  xxxxxxxxxx              xxxx.xxxx             xxxx.xx
|  *                    *          *         *
|  *<-column-->*<------column------>*<-------column---->*
|  *  margin   *   margin            *   margin         *
|  *  width    *   width             *   width          *
|  *    1      *     2               *     3            *
|  *           *                     *                  *
|  <-------------table margin width----------------->*
|  page margins
|_____
                                                    page

FIG.4
```

```
1   procedure autoinsert (cursor, eob, start, rm, lm:integer;
                         buffer: packed array[1..m] of char);
2
3     const
4         rcr = ord(z);
5     var
6         linewidth, guttercount, totcolwidth, spacing, xtra, i,
                                                    counter:integer;
7         gutterfound:boolean;
8   begin
9       gutterfound:=false; linewidth:=0; guttercount:=0; totcolwidth:=0;
10      cursor:=start;
11      while buffer[cursor]<>rcr do
12          begin
13              while buffer[cursor]=' ' do
14                  begin
15                      gutterfound:=true; linewidth:=linewidth+1;
                                           cursor:=cursor+1;
16                  end (*whiledo buffer[cursor]=' '*);
17              if gutterfound then
18                  begin gutterfound:=false; guttercount:=guttercount+1
19                  end (*if*);
20              while (buffer[cursor]<>' ') or (buffer[cursor]<>rcr) do
21                  begin
22                      totcolwidth:=totcolwidth+1; linewidth:=linewidth+1;
                                                    cursor:=cursor+1;
23                  end (*whiledo buffer[cursor]<>' '*);
24          end (*whiledo buffer[cursor]<>rcr*);
25      if guttercount=>1 then
26          begin
27              if (totcolwidth+guttercount)<=rm-lm then linewidth:=rm-lm;
                                                        end(*if*);
28              spacing:=(linewidth-totcolwidth) div guttercount; xtra:=
                         (linewidth-totcolwidth) mod guttercount;
29              cursor:=start;
30              repeat
31                  cursor:=cursor+1
32                  while buffer[cursor]<>' ' do
33                      begin
34                          for i:=cursor+1 to eob do
35                              begin buffer[i-1]:=buffer[i]; eob:=eob-1; end
                                                                (*for*);
36                      end (*whiledo buffer[cursor]<>' '*);
37                  counter:=spacing;
38                  if xtra >0 then begin counter:=counter+1; xtra:=xtra-1;
                                                              end(*if*);
39                  while counter<>0 do
40                      begin
41                          for i:=eob downto cursor do
42                              begin buffer[i+1]:=buffer[i]; eob:=eob+1;
                                      buffer[cursor]:=space; end (*for*)' '
43                      end (*whiledo counter<>0*);
44                  guttercount:=guttercount-1;
45              until guttercount=0;
46          end (* if gutter =>1*);
47      cursor:=start;
48  end (*autoinsert*);
```

FIG.6

AUTOMATIC INTERTEXT COLUMN SPACING

FIELD OF THE INVENTION

This invention relates to word processing, and more particularly, to a machine assisted interactive method and means for evenly adjusting the gutters between columns during formatting of multiple text columns on a page in a word processing system.

BACKGROUND ART

Pascoe, U.S. Pat. No. 4,207,011, issued June 10, 1980, describes the formatting of sequentially stored text columns by embedding semaphore codes. Upon the side-by-side printout of the stored text columns, the embedded codes preserve a synchronous relationship between their varying line spacings. That is, a code character in line i initiates a memory scan to ascertain the existence of any counterpart line i to be printed from column 2.

Greek, et al., U.S. Pat. No. 3,952,852, issued Apr. 27, 1976, discloses a system having a keyboard and printer, a buffer and control, and a multicolumn playout control unit. During set-up, a tab field for defining the printing locations of the column, can be set up by operator key. The columns, which are stored sequentially, are printed out in a side-by-side manner, the beginning of each column being defined by the keying of a column begin code. In contrast, word processing systems where text stream input is stored and displayed, tables of multiple columns of text or data are formatted by an operator involving a displayable scale line on the system. The operator independently ascertains column widths and gutters, and then must count and enter the tab stops along the scale line.

Word processing is to be distinguished from text processing in both the kind and degree of facilities available to the operator. Text processing involves the use of a large capacity CPU shared among multiple terminals empowered with a text processor such as SCRIPTS/VS having rapid access to megabytes of fast DASD storage. In text systems, threaded data lists executed in SCRIPTS permits flexible operator formatting taking advantage of the sophisticated processing operations on list pointers and indices. To the contrary, word processing is focused on stand-alone terminals in which letters, small documents, and memos are processed by microcomputers interacting with limited diskette storage of 200 or 300 kilobyte capacity. The documents and pages are processed as end marked, semi-infinite, simply structured character strings with few embedded controls. The comparative absence of highly elaborated data structures saves memory but requires special formatting considerations, such as documents composing for tables and the like.

In the IBM Program Product "Document Composition Facility/User's Guide", Second Edition, April 1980, IBM publication No. SH20-9161-1, at Chapter 5, pp. 67-69, there is described multicolumn page layout for the SCRIPT/VS text processing system. SCRIPT defines a multiple column layout requiring operator specification of column number, width, and left margin position for each column. Thus, the prior art of intercolumn spacing is completely operator defined with limited, if any, automatic assistance.

In the co-pending Horn and Shipp application, U.S. Ser. No. 305,260, filed on Sept. 24, 1981 there is depicted a multiple text column formatting method executed in an interactive word processing system having a display screen, a keyboard, a memory for storing formatted information, and an intercoupling microprocessor. In the Horn, et al., type of prompting interactive word processor, multiple text column tables are formatted prior to text entry by invoking a column layout function mode. Consonantly, menued prompts prominently displayed guide the operator in order to structure the column widths and gutters (intercolumn spacing) by repeated keying of text characters or widths and then inserting space characters over to the next column position and repeatedly keying in text characters to define the widths of yet another column. This single entry line permits the column and gutter widths to be automatically aligned with tab stops. The formatted column example line is then vector encoded and saved. If it is subsequently desired to revise a saved table, its encoded format line is recalled, rebuilt, and then revised by entering repeated text and control characters to define an altered width of an existing column or a new column. In turn, the revised column example line may be encoded and saved. There is also provided an automatic one character wide gutter insertion when creating a new column to prevent the operator from failing to include a gutter after formatting his adjacent column.

The Invention

It is an object of the inventive method for evenly adjusting the gutters between columns during the formatting of multiple text columns on a page in an interactive word processing system formed from a keyboard, display, memory for storing formatted information, and an intercoupling microprocessor. The method steps include operator keyboard entry of a line of at least two column width examples formed from repeated text and control characters; and responsive to function key actuation, the machine step of modifying the example line by the automatic insertion of spaced characters in the gutters between the column examples proportional to the unoccupied escapement between the page margins divided by the number of gutters. In addition to automatically producing even spacing between each column within the vertical page margins, there is also executed the additional step of adjusting the tab stops within each column accordingly.

Advantageously, this method is in harmony with other column layout functions-by-example. Generically, an operator "teaches" the word processor to format text data for use in a multiple text column table by way of dummy illustration supplemented by automatic assistance.

BRIEF DESCRIPTION OF THE DRAWING

FIG. 4 shows table and column layout spatial definitions.

FIG. 6 is a PASCAL source code implementation of the machine response to the operative function keystroke of the method.

DESCRIPTION OF THE PREFERRED EMBODIMENT AND INDUSTRIAL APPLICABILITY

Brief System Machine Description

Figure 1:
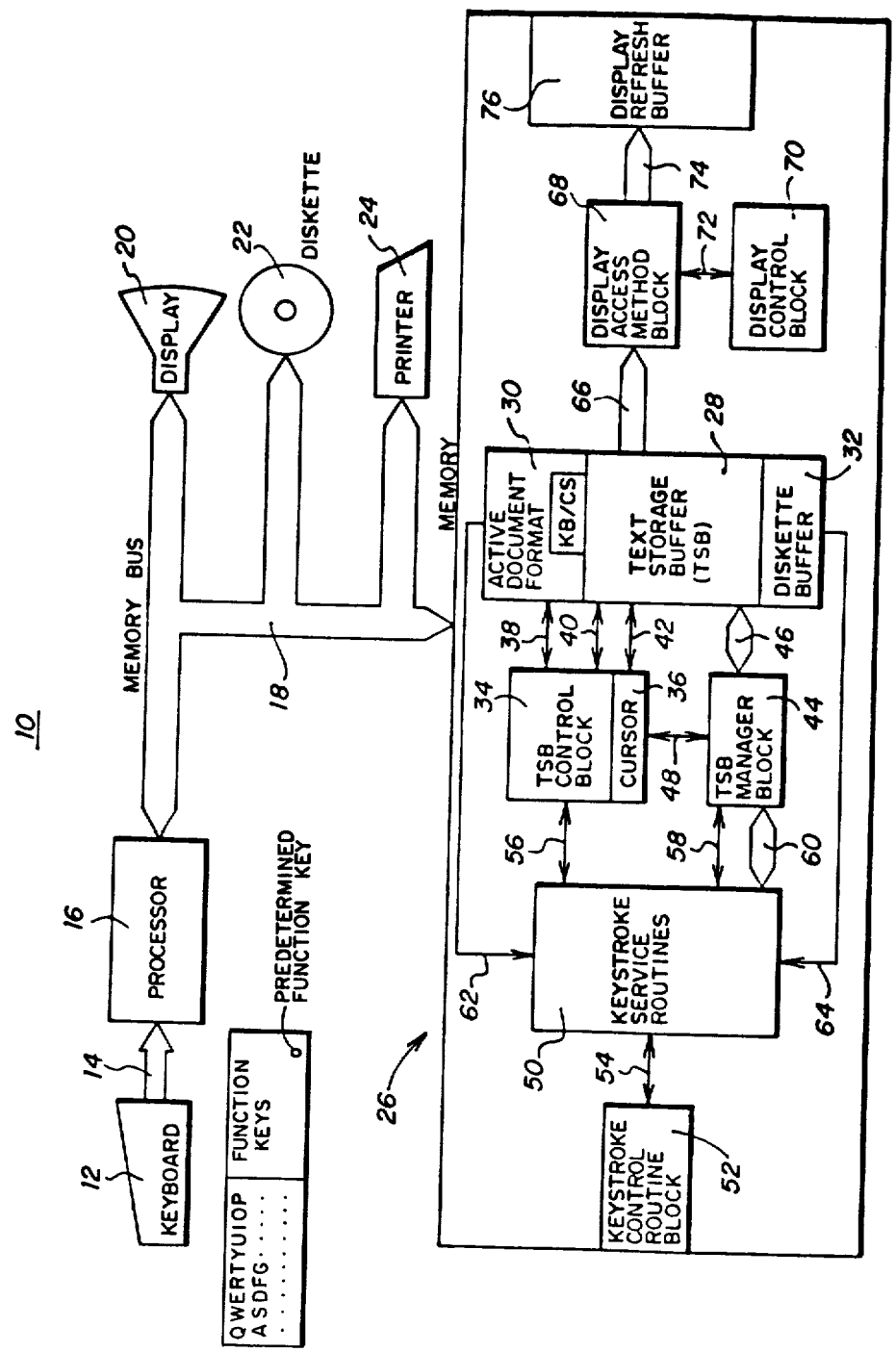
FIG. 1 depicts a word processor system configuration including soft and hard copy output facilities, internal and external memory, a keyboard, a microprocessor, and intercoupling bus.

Referring now to FIG. 1, there is shown a word processing system 10 which includes a keyboard 12 for receiving text character entries and transmitting the text through a path 14 to a microprocessor 16. A memory bus 18 couples processor 16 to a CRT display 20, diskette drive 22, a printer 24, and a random access memory 26. Keyboard 12 preferably should exhibit a set of actuable key faces of any standard alphanumeric character set together with function keys. The function keys are in effect mode switches. That is, a function key upon operator actuation operates as an event driver. It interrupts microprocessor 16 which then task switches the processor 16. This suspends execution of the current task and transfers control to the starting address of the instruction string resident in memory 26 of the program bound or associated with the function key. Such task switching involves saving the contents of principal registers and transferring to a program counter the starting address of the first location in memory 26 of the program. The program counter causes the contents to be read out from RAM 26 and transferred to a program decoder or functional equivalent thereof for execution. Since the binding of specific programs to function keys and task switching upon function key actuation is well known to the art further description thereof shall not be made.

An operator enters a text stream through the keyboard 12. Each page of text is stored and processed in memory 26. As the text stream is received in the memory 26, it is simultaneously presented to display 20. After the buffering of the text in text storage buffer 28 of memory 26, the stream can be saved on diskette drive 22 or hard copy printed out on printer 24.

Memory 26 includes a number of data areas and functional programs for operating with the text stored in system 10. The text and related control function are saved in a text storage buffer 28 which includes an active format storage section 30 and a diskette buffer 32. The keyboard character set (KB/CS) for the documenting process is available in the active format storage section 30.

As each character is entered through the keyboard 12, it is processed by one or more of the keystroke service routines stored in memory location or block 50 as executed by processor 16. Also, the text stream stored in text storage buffer 28 is simultaneously entered into display refresh buffer 76. This buffer 76 drives display 20. The diplay control block 70 and display access method block 68 provide a window which may be scrolled relative to the contents of the TSB 28. It should be noted that both the diskette drive 22 and printer 24 have dedicated buffer block areas assigned thereto. Lastly, block 70 serves to store flags and status information as required by the operation of block 68.

Text storage buffer control block 34 serves as the data area for the text storage buffer 28. A cursor control buffer section 36, is included within the text storage control block 34. Block 34 is linked through a channel 38 to the active format storage section 30 and through a channel 40 to the text storage buffer 28. The cursor control section 36 is connected through a channel 42 to text storage buffer 28.

A text storage buffer manager block 44 is coupled through a channel 46 to the text storage buffer 28. Block 44 is further coupled through a channel 48 to the TSB control block 34.

As each character is entered through keyboard 12, it is received at the memory 26 by the actions of one or more keystroke service routines in memory location or block 50. A keystroke control unit block 52 is a data area which determines the selected keystroke routine for processing the received character. Block 52 is linked to the keystroke service routine in memory location or block 50 through channel 54. The keystroke service routine block 50 is further linked through a channel 56 to the text storage buffer control block 34 and through channels 58 and 60 to TSB manager block 44.

The active format storage section 30 is connected through channel 62 to the keystroke service routine block 50. The diskette buffer 32 is connected through channel 64 to the keystroke service routine block 50.

The text characters and control information in TSB 28 are communicated through channel 66 to a display access method block 68. This serves as an interface for the display 20. Corresponding access method blocks for the keyboard 12, diskette drive 22, and printer 24 are substituted when communications with these units is required. Display control block 70 is connected through path 72 to the access method block 68.

Partial Machine Register Organization, Data, and Control Flow

Figure 2:
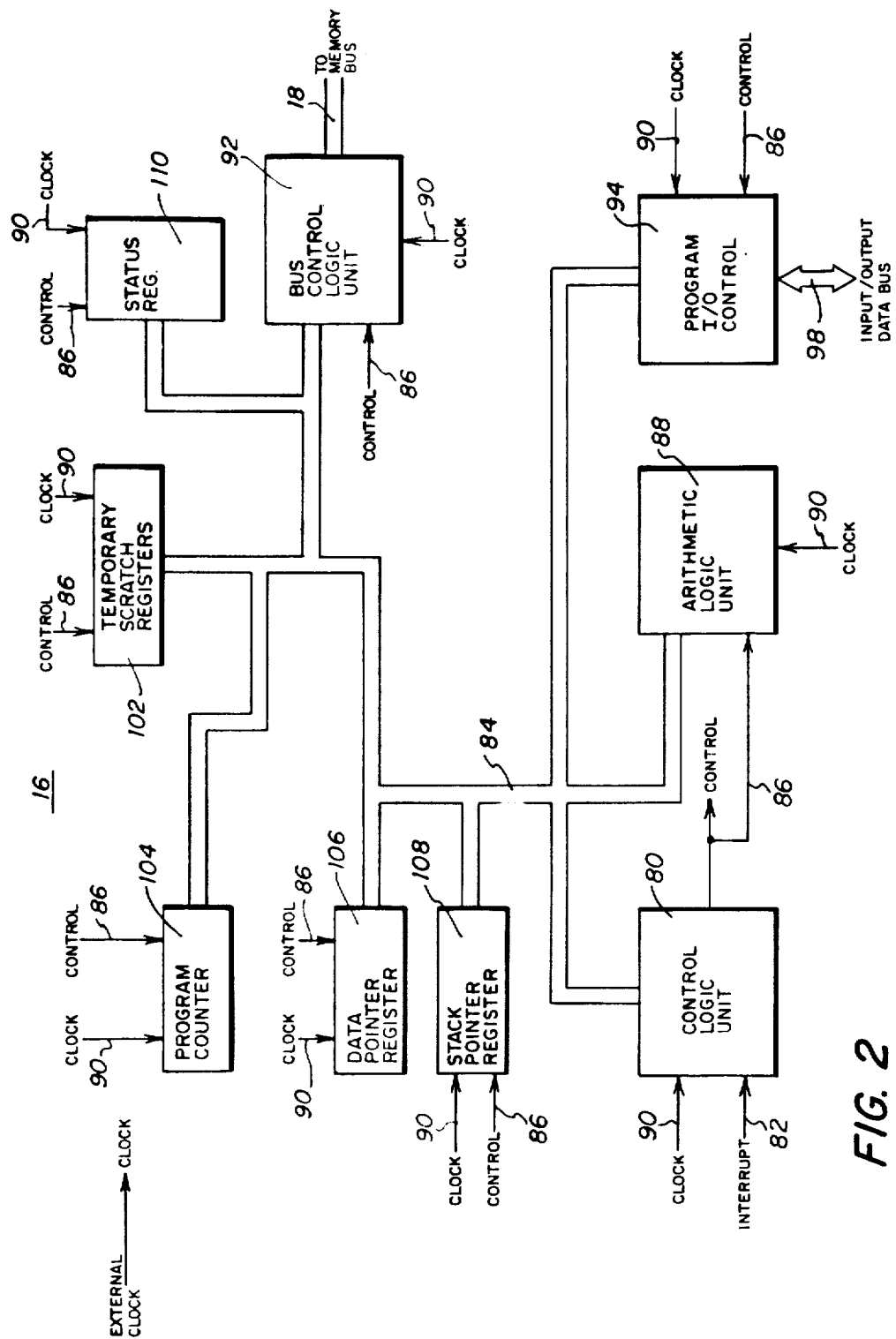
FIG. 2 delineates a partial register organization of the microprocessor shown in FIG. 1.

Referring now to FIG. 2, there is illustrated the contemporary machine register organization of processor 16. Such a processor 16 may be commercially implemented as, for example, by an Intel Corporation microprocessor model 8086. According to FIG. 2, the processor 16 includes a control logic unit 80, which responds to an interrupt on device bus 82 from keyboard 12. Logic unit 80 is also connected to a data and address bus 84 intercoupling other logic elements.

In response to a fetch instruction from random access memory 26, logic unit 80 generates control signals to other elements. The signals are coupled by way of path 86, illustratively connecting ALU 88. Synchronous operation of unit 80 and other logic elements is ensured by way of clock pulses from an external clock source transmitted over path 90. Data and instructions to be executed by processor 16 are entered over logic unit 92. Data also may be entered by way of a programmed input/output logic 94. Logic unit 92 couples storage elements of RAM 26 and receives instructions by processing data from the I/O control 94 or from RAM 26.

Device controlled information from processor 16 is passed by I/O control unit 94 and data bus 98. Input on data bus 98 from keyboard 12 is processed internally through processor 16 by instructions over bus 84 to logic unit 80 by ALU 88. ALU 88 in response to a signal on path 86 and in accordance with instructions received on bus 18 executes arithmetic operations stored in temporary register 102.

An external clock signal source simultaneously supplies clocking or strobe signals for synchronizing the diverse transmission and memory accessing elements of the machine. Indeed, clock signals on path 90 are provided to each of the major elements. As can be seen in FIG. 2, a conventional microprocessor architecture is set out, for example, a program counter 104 when incremented by the clock signals on path 90 specifies location either in a register or in a memory for the next instruction to be executed. Data pointer register 106 and stack pointer register 108 respectively contain pointers to the address location for recently entered characters, and, the location in the memory of the instruction stack (i.e, to a last in, first out, stack used for procedure and function calls, the storage of static variables, and temporary values during expression evaluation). Element 110 is a status register with reference either to availability or content error.

Prompting Word Processor Display

In a prompting word processor, display device 20 is of the CRT type and is capable of setting out monospaced characters. In this regard, reference should be made to FIG. 3. A typical display is partitioned such that lines 1 or 2 are status lines reflecting the information state of the display. Next, lines 3 through 23 define a viewpoint in which are set out menus, text, and information necessary for interactive processing. Line 24 is a prompt line which provides information stepping the operator to the next menu function or activity. Lastly, line 25 is a message line which indicates whether messages are flashing or queued.

Figure 3:
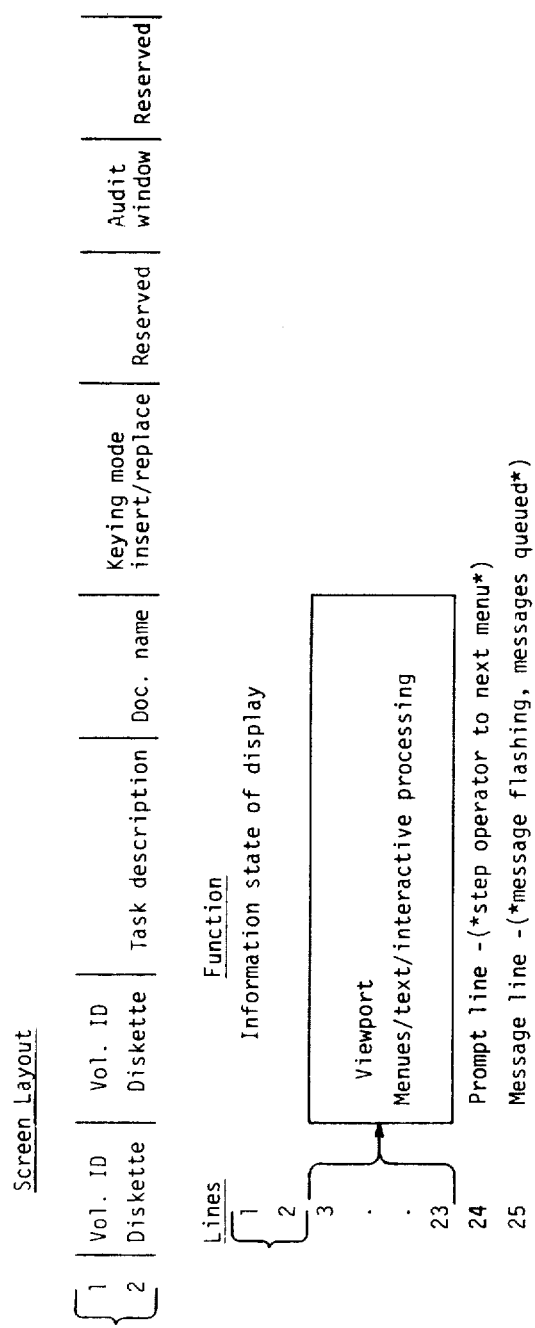
FIG. 3 is a display screen (soft copy) layout organization of information as viewed by a word processor operator.

A typical screen layout of the information state or display lines 1 and 2 is shown just above the portion of FIG. 3 denominated "function". Such a screen layout could contain the volume number or identity of the diskettes, task description, document name, the keying mode such as insert or replace, and other specialized or reserved functions.

Column and Gutter Definitions

Referring now to FIG. 4, there is shown the gutter and column width parameters specifying a set of adjacent vertical columns starting at the table left margin and extending to the right margin. Column and gutter widths are defined in terms of the width of a character included within a predetermined font or in absolute escapement units such as 1/1440 inches per unit. In this regard, a column width is preferably a multiple byte number designating the width of a column text as the number of character units counted relative to the preceding gutter. Likewise, a gutter width is a multiple byte number designating the amount of white space in character widths associated with a vertical column. The first gutter width is specified as a unit count relative to the left margin. Other gutter widths specify unit counts relative to the right edge of the previous column widths.

Multitext Column Layout Formatting By Example

The purpose of column layout functions in an interactive prompting word processing system 10 is to provide an opportunity for an operator to specify all of the attributes of a column table format so as to permit implementing column functions such as delete, move, copy, and revise. These attributes include the widths of each column, the tab stop within each column, and the spacing (gutters) between columns. In the copending Horn and Shipp patent application Ser. No. 305,260, filed Sept. 24, 1981, there is described a method for formatting multiple columns either when creating a new table or for revising existing tables by way of modifying selected column widths or inserting a new column therein. The method involves initializing the system by selectively suppressing text edit controls and reserving resources such as an allocation of memory. The table formatting is executed by way of operator keying of repeated text characters and controls as an example. The "example line" is then encoded and saved. If the table is to be newly created, then the operator keys in a new format under a displayed scale line designated the "column example line" by the repetitive keying of text and control characters. The tab rack constitutes column and gutter width information. Said tab rack is encoded as control bytes associated with the BEGIN TABLE (BT) control character. This information is saved. Thus, if the table is to be revised, then the "column example line" is displayed and reconstituted according to the previously saved encoded information. At that time, the operator can key in revisions by way of example. Again, the revised layout is saved.

Automatic Intercolumn Spacing

The method of the invention is invoked during a column layout mode when an operator requests the word processing system to "justify" the specified columns proportionally from each other and the specified margins. According to the method, the operator keys in an example for each column specifying the width and the tab stops for each column. Each example must be separated by at least one space. This may be clearly seen in the illustration shown at the top of FIG. 5. Each of the column examples is under a scale line which registers the tab stops. If the operator has keyed in the three columns with varied spacing therebetween as represented by repeated text character "a"s, the intercolumn spacing function is invoked by stroking a dedicated (COLUMN LAYOUT) function key. The machine responds by determining the amount of unoccupied line widths, dividing it by the number of gutters, and then inserting space characters so that the gutters between adjacent columns are even.

Figure 5:
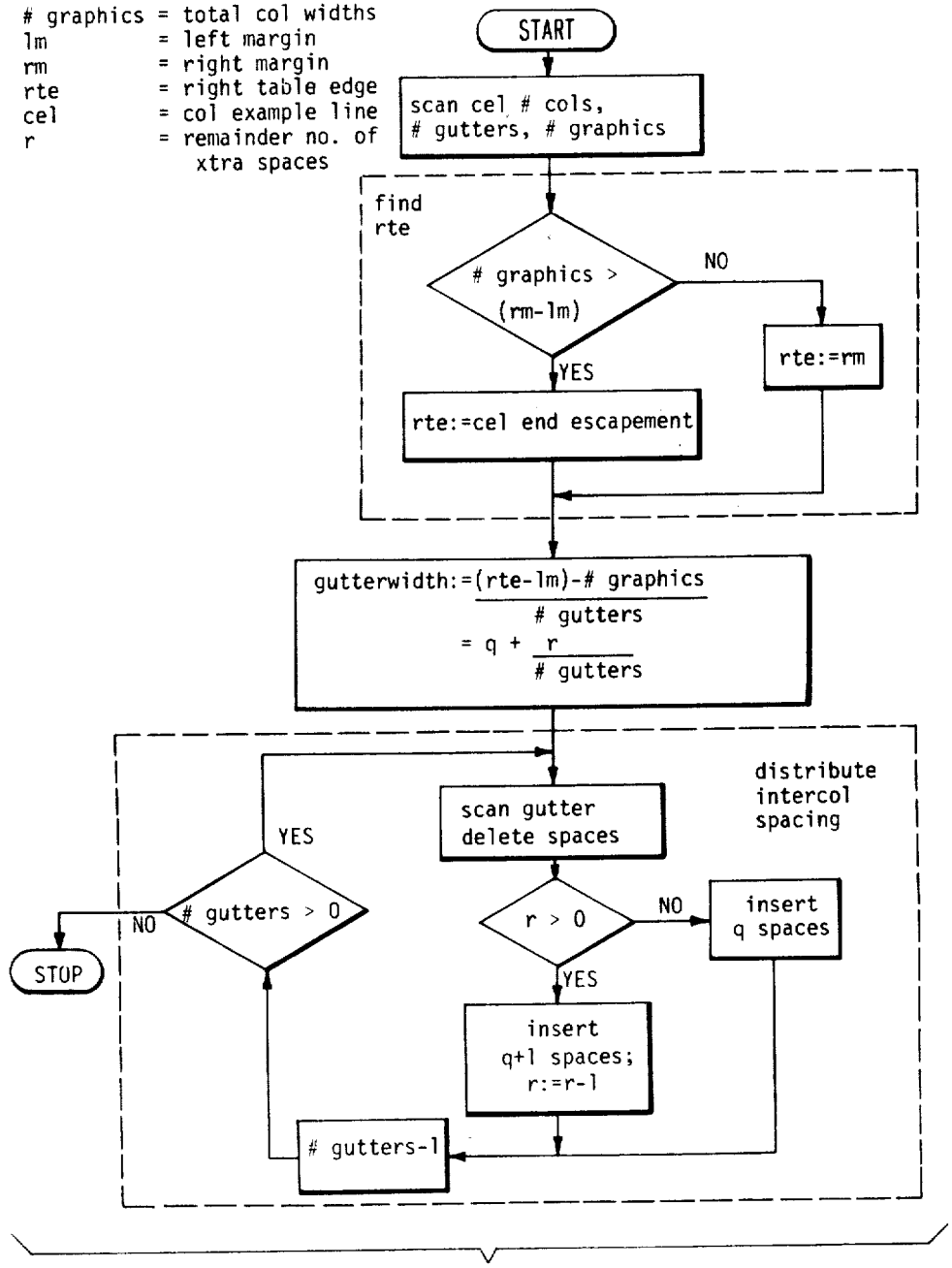
FIG. 5 depicts the method flow diagram of the invention.

Reference should be made to the method flow diagram also depicted in FIG. 5. Starting at the top, the following method steps are responsive to the function key actuation after the operator has entered a column example line. First, the microprocessor 16 scans the column example line to determine the number of columns, the number of gutters, and the number of graphic characters. In this regard, the left and right table margins are known. After the scan, the next step is to find the right table edge and assign it to the right margin. Thus, if the total column widths are greater than the space between the right margin and left margin, then the right table edge is placed upon the end of the column example line escapement. If the total column widths fit within the right- and left-hand margins, then the right table edge is assigned to the right margin. Next, the even gutter width is determined as a function of the unoccupied space between the margins and the number of gutters. This means that the distance between the right table edge and the left margin from which is subtracted the total column widths defines the total available unoccupied character escapement. If this quantity is divided by the number of gutters, then the quotient and remainder can be used to govern the actual insertion of space characters during the next step of distributing the available white space evenly.

Starting at the beginning of the column example line, the inner column spacing is distributed to each gutter by the repetitive application of the steps of scanning the next gutter, deleting all the spaces in said gutter, and if the remainder r is greater than 0, then insert the integer quotient +1 spaces and decrement the remainder r by 1. Otherwise, insert the integer quotient of spaces. After space insertion, the number of gutters is diminished by 1 and, if greater than 0, the cycle is repeated until the number of gutters is equal to 0.

A PASCAL Source Code Implementation

A PASCAL source code implementation of the machine response to the operative function keystroke is set out in FIG. 6. PASCAL is a well-known high-level source code programming language suitable for use in devising control and operating system programs, the object code of which, upon execution in an interactive word processor, suitably implements the method of invention. The PASCAL language is well appreciated in the art. Reference can be made to Jensen and Wirth, "PASCAL User Manual and Report," Second Edition, Springer-Verlag, 1974; Wirth, "Algorithms Plus Data Structures Equal Programs," Prentice-Hall Series in Automatic Computation, 1976. The language has been adopted as an ISO Standard. PASCAL compilers are resident in microprocessors, as for example, the UCSD PASCAL in the Apple II Plus computer system made by Apple Computer, INc., Cupertino, Calif.

The PASCAL implementation is expressed by a procedure labeled 'autoinsert'. This procedure is invoked by a procedure call (not shown) which passes numerical parameter values defining the current position of the display cursor in respect of the table being formatted. The other formal parameters in this procedure autoinsert are 'eob', a control character defining the end of a character string, 'start' defining the beginning of a character string, 'rm' and 'lm' respectively designating the vertical table right and left margins. The character string is represented by the variable 'buffer'. All of the input parameters are of the integer type. In PASCAL, a character string must be represented as a packed array of type characters. In this procedure, the required carriage return (rcr) is depicted as a constant having the ordinal value of z in the ASCII character code. The variables local to the procedure are all of the integer type but one, (gutterfound) which is of type Boolean. For data typing details, reference should be made to the above-named language texts.

Because the "variables" are dynamically generated when the program set out in FIG. 6 is executed, those variables such as "linewidth" and "guttercount" which are operative as counters are operative as logical counters rather than physical units. Such is a matter of design choice. Such logical counters will not have a physical existence except as a RAM memory location assigned according to the memory map discipline governing RAM 26 and the PASCAL compiling of the source code set out in FIG. 6.

Of the integer local variables, 'linewidth' is a running count of the number of characters being scanned in the column example line. The 'guttercount' represents the number of gutters actually encountered. The 'totcolwidth' is a running variable of the number of characters encountered in scanning across the column example line. 'spacing' is the integer guotient of the 'linewidth' divided by the 'guttercount'. 'xtra' is the remainder expressed as the 'linewidth' modulo 'guttercount'. Lastly, 'i' is an indexing variable used for character insertion. The value of the Boolean variable 'gutterfound' is an indicator which invokes the determination of 'gutterwidth' or 'totcolwidth'. The programmatic parallel to the method is set out between lines 8 and 47. In this regard, line 9 deals with initialization of all of the counter registers, while a line 10 moves the cursor to the start of the column example line.

Schematically, the program consists of a first 'while-do' loop between lines 11 and 24 which scans the entered character example line to determine the line width, the total column width, and the number of gutters. Lines 25 through 47 include the determination of the intercolumn spacing at line 27-28, and the distribution of that spacing by a 'repeat-until' loop bounded by lines 30-45. In order to ensure that the automatic intercolumn spacing is invoked only in the presence of two or more columns, a conditional statement, 'if-then' is inserted on line 25 with an ending on line 46. The next paragraphs will describe a functional analysis of the procedure string.

Referring again to FIG. 6, line 9 constitutes the initialization of the significant registers. In this regard, the Boolean variable 'gutterfound' is set to false and the running character width count represented by 'linewidth' and 'totcolwidth' are set to 0 as is the 'guttercount'. Initialization is completed in line 10 by moving the cursor to the start of the column example line.

The ascertainment of the line width, the total column width, and the number of gutters is a function, as previously mentioned, contained within the 'while-do' loop between lines 11 and 24. This outer loop consists of a pair of subordinate 'while-do' loops and a conditional statement. The first inner 'while-do' loop between lines 13 and 16 measures the width of a gutter. As long as each successive character in a text string is a space character, then the line width counter is incremented and the cursor is moved to the next character. The conditional statement represented by lines 17 through 19 resets the 'gutterfound' Boolean variable to false and increments the gutter counter by +1. The second internal 'while-do' loop depicted in lines 20-23 is invoked if the buffer cursor character is not a space nor the end of line. Consequently, for each character satisfying either one of those conditions, the running variables 'totcolwidth' and 'linewidth' are incremented as is the cursor. When a space character or an end of line is encountered, the 'while-do' loop is not executed. The transfer of control is relinquished to the 'while-do' loop between lines 13-16. Consequently, the moment an END OF LINE 'rcr' is encountered, control is transferred from the outer 'while-do' loop of lines 11-24 to the determination bounded by conditional statements 25-27.

At line 25 if at least one gutter is found, then it is necessary to obtain the number of characters available to the right margin. That is, in line 27, if the total occupied characters of the column widths plus a minimum of one space per gutter is less than or equal to the right and left margin differences, then the line width is set equal to the difference between the right and left margins. This implementation assumes that the cursor position monotonically increases from left margin to right margin.

Line 28 represents the computation of the intercolumn spacing. Here the unoccupied character escapement, represented by two integer variables 'spacing' and 'xtra'. Spacing is assigned the integer quotient value of (linewidth-totcolwidth) divided by guttercount. 'Xtra' represents the integer remainder of the division and is assigned the value of (linewidth-totcolwidth) modulo guttercount. After this, the cursor is repositioned by line 29 to the start of the column example line.

The 'repeat-until' loop embraced within lines 30-45, mechanizes the insertion of spacing characters between each column, that is, the distribution of the intercolumn spacing forms equal width gutters.

During each repeat cycle, the cursor on line 31 is incremented until the first gutter is found. Further, the repeat cycle consists of two 'while-do' loops which respectively delete or insert a space character under the appropriate conditions. Illustratively, the first 'while-do' loop scans the gutter and deletes spaces. This is PASCAL implemented by a functional equivalent of moving the characters to the right of the instantaneous cursor position to the end of the buffer over to the left, thereby eliminating spaces between column margins. This is expressed in lines 33-36 by way of a 'for' loop indexed from 'cursor+1' to the integer value representing the buffer end (eob). Since the column widths are preserved, there is no information lost by deleting the space characters. The remaining steps are to reinsert an even number of space characters to define the gutters between adjacent columns. To this end, a new variable 'counter' is assigned the value of 'spacing' on line 37. In order to ensure that the number of remainder spaces represented by 'xtra' are evenly distributed, one additional space is added in each gutter formation cycle. Parenthetically, the number of such cycles is controlled by the variable 'guttercount'. Thus, to ensure an extra space insertion, the conditional statement on line 38 causes the variable counter to be incremented by +1 with the variable 'xtra' decremented by −1.

The actual space character insertion is governed by the 'while-do' loop on lines 39-44. The insertion will be for the width of one gutter. This is represented by the distance in a 'for' loop index i from the end of buffer down to the cursor position moving from right to left. The actual assignment is made on line 42 in which buffer[cursor]:=' '. In the PASCAL implementation, this is accomplished by moving the rightmost column widths which amounts to 'counter' positions to the right and filling in the hole with space characters. When the second 'while-do' loop completes this task, the variable guttercount is decremented by 1 on line 44. Unless the guttercount is $\emptyset$, the loop is repeated with the cursor on line 31 being incremented and the cycle repeated for the scanning of the next gutter to delete the spaces and then the insertion of the appropriate even number. When the guttercount is equal to $\emptyset$, the cursor is repositioned to the start of the column example line and the procedure transfer control back to the interactive word processor and interface.

The PASCAL source code implementation was selected to express aspects of the invention in view of its compactness and currency among persons having ordinary skill in this art. Other method implementations can be formulated in assembly level language as, for example, set out in Osborne, "8080 Programming for Logic Design", Sybex, Berkeley, Calif. 1976.

While the invention is particularly described with reference to a preferred embodiment, it is appreciated that its departure from the prior art is to produce equal size gutters between each column in contrast to printer justification which merely distributes the white space between the end of a line and the right margin to the spaces on the line. Significantly, the method of this invention by altering the number of spaces between the column examples on the column example line has preserved each column while readjusting its horizontal position. Since tab stop settings for the table are part of the column examples, the tab stop settings have been properly adjusted to their correct locations. It will be further understood by those skilled in this art, that various other changes in the form and details may be made therein without departing from the spirit and scope of the invention.

Having thus described our invention, what is claimed as new and desired to secure the Letters Patent is:

1. A method for forming a multiple text column table within a page, the space between adjacent columns being denominated a gutter, the left edge of the leftmost column and the right edge of the rightmost column being denominated a page or table margin, said method evenly adjusting the gutters between columns during the formatting of the multiple text columns on the page in an interactive word processing system formed from a keyboard, display, memory for storing formatted information, and an intercoupling microprocessor, comprising the steps of:

operator entering of a line of at least two column width examples of repeated text and control characters; and responsive to function key actuation, the machine step of modifying the example line by the automatic insertion of space characters into the gutters between column examples approximating the unoccupied escapement between the page margins divided by the number of gutters, said machine step further including the steps of ad seriatim scanning each gutter and removing space characters encountered therein, initializing a counter index to the number of spaces to be inserted, and inserting the space characters and decrementing the index for each insertion until the index is exhausted.

2. A method for inserting an approximately even number of space characters between formatted text column widths of a multicolumn table in an example line of repeated text and control characters operator keyed during the column layout mode of an electronic page in an interactive word processing system, and responsive to the stroking of a predetermined key, the machine steps of:

scanning the example line and counting the number of columns, gutters, and text characters;

moving the right table edge to coincide with the right page margin if the example line is less than the horizontal character escapement between the left and right margins, and moving the edge otherwise to the line end;

computing the gutter width as the integer quotient of the unoccupied escapement between the margins divided by the number of gutters and the integer remainder of the unoccupied escapement modulo number of gutters; and forming each gutter by inserting the quotient number of space characters, between consecutive overlapping pairs of columns, said gutter formation being repeated until the number of gutters is exhausted.

3. A method according to claim 2 wherein the number of space characters is equal to the quotient plus 1, whereby the remainder is evenly distributed.

* * * * *